United States Patent
Seiler et al.

[15] 3,650,299
[45] Mar. 21, 1972

[54] INSULATION APPARATUS AND TECHNIQUES FOR FLUID-TRANSMITTING PIPES

[72] Inventors: Edwin Nail Seiler, 80 Hunterdon Boulevard; Weaks Gardner Smith, 48 Southgate Road, both of Murray Hill, N.J. 07974

[22] Filed: Dec. 14, 1970

[21] Appl. No.: 97,587

[52] U.S. Cl..............................................138/149, 138/99
[51] Int. Cl.........................................F16l 55/16, F16l 9/14
[58] Field of Search......................138/148, 149, 99, DIG. 9

[56] References Cited

UNITED STATES PATENTS

| 3,496,963 | 2/1970 | Bardgette | 138/99 |
| 3,480,493 | 11/1969 | Bauer | 138/DIG. 9 |
| 2,930,407 | 3/1960 | Conley | 138/149 X |
| 3,480,043 | 11/1969 | Proudfoot | 138/99 |

FOREIGN PATENTS OR APPLICATIONS

| 950,314 | 2/1964 | Great Britain | 138/149 |

*Primary Examiner*—Herbert F. Ross
*Attorney*—Roderick B. Anderson

[57] ABSTRACT

Pipes for transmitting petroleum across permafrost earth are insulated by a succession of inflatable tubular bag members. The bag members are inflated by forcing into them insulative material under air pressure. When the pipes transmit petroleum, the average density of the pipe and inflated bag members is smaller than that of the permafrost earth. Thus, if the permafrost should melt, the insulated pipe would float rather than undergoing serious stresses that would otherwise occur.

5 Claims, 2 Drawing Figures

PATENTED MAR 21 1972  3,650,299

INVENTORS  EDWIN N. SEILER
WEAKS G. SMITH
BY
RB Anderson
ATTORNEY

INSULATION APPARATUS AND TECHNIQUES FOR FLUID-TRANSMITTING PIPES

BACKGROUND OF THE INVENTION

This invention relates to apparatus for insulating pipes, and more particularly, to apparatus for insulating pipes designed to transmit petroleum along frigid land regions.

The discovery of oil along the northern coast of Alaska has created a pressing need for effective ways of transmitting petroleum fluids across arctic and subarctic land regions. These land regions are, of course, frozen a large part of each year and are composed largely of permafrost earth, or earth at least part of which is permanently frozen. The permafrost earth tends to become fluid-like and unstable when it is melted; for example, the surface of such regions tends to become swampy or muddy during the summer months.

These characteristics of permafrost earth have made it difficult to construct and use petroleum pipelines in the normal manner. While the earth, when frozen, is stable and provides good support for the pipeline, it becomes unstable when the permafrost melts and the pipeline tends to sag and it may break. Moreover, the petroleum must often be heated to permit transmission through the frozen environment, further increasing the likelihood of local permafrost melting with consequent breakages. Needless to say, an accidental pipeline break can be catastrophic because of the serious environmental pollution that could result from petroleum flooding of remote arctic lands. It is, of course, also desirable to minimize heat loss from the pipe to reduce the effects of possible thermal pollution of remote arctic regions.

SUMMARY OF THE INVENTION

It is an object of this invention to provide effective fluid transmission across frozen land regions.

It is another object of this invention to provide effective insulation of fluid pipelines.

It is another object of this invention to reduce stresses on pipelines used to transmit heated fluids across permafrost earth.

It is still another object of this invention to protect metal pipe lines from moisture and corrosive forces.

These and other objects of the invention are attained in an illustrative embodiment comprising a succession of tubular inflated bag members surrounding the pipe. The bag members have inner and outer cylindrical wall portions made of a flexible material and a space between them which is filled with an insulative material under air pressure. The insulative material under pressure not only provides effective insulation, but also inflates the bag members so that they bear firmly against adjacent inflated bag members. Annular support members are periodically clamped to the outer periphery of the pipe for bearing against the bag members to constrain them from spurious axial movements An outer hub on the support member overlaps the contiguous bag members to provide further stability. Thus, open inflation, a succession of bag members is firmly contained within a pair of support members.

Upon inflation, the average density of the pipe, the fluid transmitted by it, and the inflated bag members is lower than the average density of the ground upon which it is supported. Thus, if the ground is frozen or is of permafrost earth, and if it is temporarily melted, it will still support the pipe and insulator assembly because its density will be greater than that of the assembly. In effect, the pipe may float upon the ground if the ground is temporarily in a fluid or unstable state, as may be the case in warm weather, or if heat from the transmitted fluid causes substantial local melting. Of course, if the ground then reverts to its frozen condition, the pipe will once more be solidly supported. Thus, the chances for a breach of the pipe due to alternate freezing and thawing of the ground are substantially reduced.

These and other objects, features, and advantages of the invention will be better understood from a consideration of the following detailed description taken in conjunction with the accompanying drawing.

DRAWING DESCRIPTION

FIG. 1 is a partially sectioned perspective view of one embodiment of the invention; and FIG. 2 is a sectional view taken along lines 2—2 of FIG. 1.

DETAILED DESCRIPTION

Figure 1:
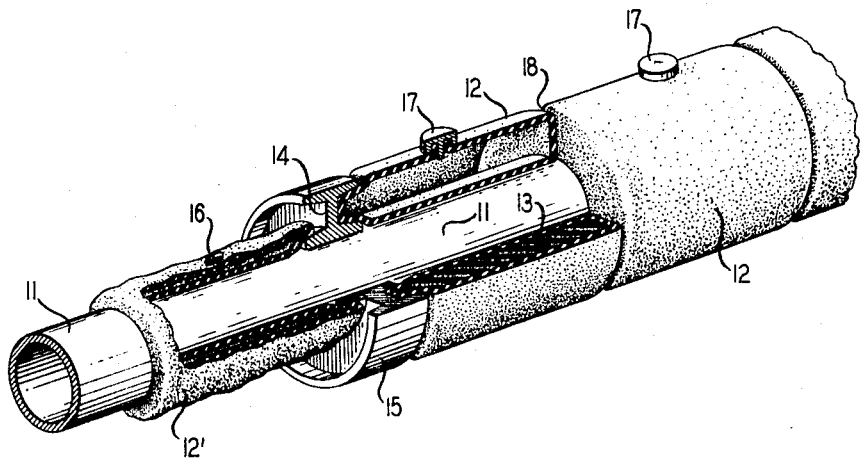
Figure 2:
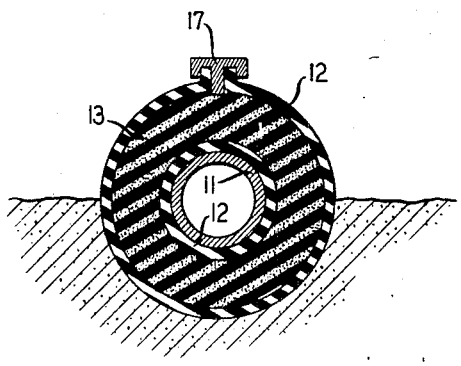

Referring now to FIGS. 1 and 2, there is shown a pipe 11, the purpose of which is to transmit a fluid such as crude oil across a land region susceptible to low temperature conditions such as arctic and subarctic regions. Axially arranged along the pipe are a plurality of inflated bag members 12 made of a flexible insulative material such as an appropriate rubber compound. The bag members are filled with an insulative material 13 under air pressure. Periodically located along the pipe is an annular support member 14 which is securely clamped to the pipe 11 for the purpose of supporting and stabilizing the bag members 12. When the bag members are inflated, the support members 14 prevent them from making substantial axial movements and therefore cause them to bear solidly against each other as shown by joint 18 in FIG. 1. Each support member has a cylindrical hub 15 which overlaps the contiguous bag members to provide further stability.

During assembly of the pipe, it is recommended that the non-inflated bag members be fitted around the pipe prior to inflation. A non-inflated bag member 12' is depicted in FIG. 1. The insulative material, which is preferably in particle form, such as foam rubber or the like, is then injected into the bag member under pressure through an injection opening 16. After inflation, the bag member is sealed by an appropriate seal member 17 inserted into the injection opening. The filling of a space by means of insulative particulate material blown into the space under air pressure is a technique well understood and widely used in the art. The appropriate design and use of a seal member 17 is also standard in the art.

As depicted in FIG. 2, the pipe and insulator assembly may be laid along a trench on the surface of the earth. Of course, when the earth is frozen, it provides dependable mechanical support for the pipe and the fluid transmitted by it. In accordance with the invention, the average density of the pipe, the fluid transmitted by it, and the inflated bag member 12 with insulative material 13, is smaller than that of the earth or ground which supports it. Thus, if the ground should melt, and temporarily become fluid and unstable, the pipe and insulator assembly will float in the trench shown in FIG. 2 rather than sinking into fluid-like mud.

The primary purpose of the bag members 12 and insulative material 13 is, of course, to insulate the fluid transmitted by the pipe from the surrounding environment. Effective insulation is, of course, essential for transmitting crude oil through pipes in arctic regions such as those of north Alaska. In order to give the petroleum fluid or crude oil a sufficient viscosity for efficient transmission, it is a known standard practice to heat the crude oil prior to transmission and periodically to reheat it. Effective insulation is, of course, required so that the oil will retain this heat; but even with the best insulation, some heat will escape and may melt the immediately adjacent permafrost earth on which the assembly rests. If this causes local melting, the pipe will not sag, for the reasons given before, and the chances of accidental breakage are substantially reduced.

In addition to permitting the assembly to float, the air pressure in the bag members improves the insulating efficiency by creating a tight seal at joint 18, where successive bag members abut. If so desired, the abutting end walls can be made in a matching non-planar configuration so as to nest together to form a "labyrinth" joint to further inhibit radial heat conduction. The joint also constitutes a more effective moisture seal than would otherwise obtain.

The foregoing has been intended to be merely illustrative of the inventive concept. Various other embodiments and modifications may be made by those skilled in the art without departing from the spirit and scope of the invention.

What is claimed is:

1. An insulated pipe of the type designed to transmit petroleum fluid along or within the permafrost earth characteristic of arctic and subarctic land regions comprising:
   a pipe;
   a plurality of axially aligned inflatable flexible bag members circumferentially engaging said pipe for substantially its entire length, each bag member, when inflated, assuming a tubular configuration having an annular cross-section;
   each bag member having a peripheral opening and being inflated with insulative material injected through said opening into said bag member under pressure;
   the average density of said pipe, the petroleum transmitted by the pipe, and inflated bag members, being smaller than the average density of said permafrost earth, whereby the pipe and insulator will be supported by the permafrost earth even at temperatures above the melting point of the permafrost.
2. The insulated pipes of claim 1 wherein:
   each bag member has an inner cylindrical surface and an outer cylindrical surface, and it includes on the outer cylindrical surface a sealable opening for permitting insulative material to be injected under pressure into the bag member.
3. The insulated pipe of claim 2 in
   successive bag members are separated and stabilized in position by annular support.
4. The insulated pipe of claim 3 further comprising:
   a pair of annular supports clamped to the pipe on opposite sides of a plurality of successive bag members to stabilize the bag members.
5. The insulated pipe of claim 4 wherein:
   each of said annular supports includes a tubular hub on the outer periphery thereof which overlaps successive bag members.

* * * * *